US011231276B2

(12) United States Patent
Lee et al.

(10) Patent No.: US 11,231,276 B2
(45) Date of Patent: Jan. 25, 2022

(54) AIRCRAFT-BASED RADIO FREQUENCY SURVEYING

(71) Applicant: THE BOEING COMPANY, Chicago, IL (US)

(72) Inventors: Donald B. Lee, Shoreline, WA (US); Mike Hood, Lake Stevens, WA (US); Timothy M. Mitchell, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 588 days.

(21) Appl. No.: 15/996,158

(22) Filed: Jun. 1, 2018

(65) Prior Publication Data
US 2019/0368875 A1    Dec. 5, 2019

(51) Int. Cl.
G01C 11/02      (2006.01)
G01S 13/935     (2020.01)
G01C 23/00      (2006.01)

(52) U.S. Cl.
CPC ............ *G01C 11/02* (2013.01); *G01S 13/935* (2020.01); *G01C 23/00* (2013.01)

(58) Field of Classification Search
CPC ........ G01C 11/02; G01C 23/00; G01S 13/395
USPC ................................ 342/367, 357.78, 357.59
See application file for complete search history.

(56) References Cited

U.S. PATENT DOCUMENTS

| 9,007,262 B1 * | 4/2015 | Witzgall ................... G01S 5/12 342/357.78 |
| 9,166,709 B2 | 10/2015 | Carlson |
| 9,550,583 B2 * | 1/2017 | Szeto ................... G07C 5/0808 |

OTHER PUBLICATIONS

Degrasse, M., "Drones used for RF test and measurement," RCRWireless News—Intelligence in All Things Wireless; Oct. 18, 2017; <rcrwireless.com/20171018/test-and-measurement/donres-used-for-rf-test-and-measurement-tag4-tag99> 2 pgs.
Yu, Ethan et al., "Automating 3D Wireless Measurements with Drones," WiNTECH 16; Oct. 3-7, 2016; pp. 65-72.

* cited by examiner

*Primary Examiner* — Bo Fan
(74) *Attorney, Agent, or Firm* — Moore IP Law (57) ABSTRACT

An apparatus includes a communications interface configured to receive, at a first aircraft, data related to a radiofrequency (RF) survey of a particular location. The RF survey is based on RF samples from at least a second aircraft. The apparatus further includes a radio, an onboard network system (ONS) configured to determine that the first aircraft is approaching the particular location, and a radio controller coupled to the radio. The radio controller is configured to automatically adjust, based on the RF survey and responsive to determining that the first aircraft is approaching the particular location, a parameter of the radio.

20 Claims, 6 Drawing Sheets

AIRCRAFT-BASED RADIO FREQUENCY SURVEYING

FIELD OF THE DISCLOSURE

The present disclosure is generally related to radio frequency surveys for aircraft.

BACKGROUND

Aircraft often send flight data and other information related to the aircraft to a network of an airport. For example, upon arriving at a gate of the airport, the aircraft sends flight data wirelessly to a particular sub-system of the airport, such as a computer or server of an airline that operates the aircraft, a radio tower of the airport, one or more other sub-systems of the airport, or a combination thereof.

In some circumstances, the aircraft stores a relatively large amount of information to be offloaded upon arrival at an airport. As a result, offloading the information in a particular time frame (e.g., prior to departure of a subsequent flight) can be difficult. Further, RF noise or interference can delay offloading of the information. For example, RF noise or interference can introduce errors in the transmission of the information, resulting in the need to retransmit the information, so that the received information is accurate.

Sometimes a survey is performed to determine radio frequency (RF) characteristics of an airport in order to facilitate offloading of data from aircraft. For example, the survey can be performed using a receiver mounted in a terrestrial vehicle (e.g., a truck or a van) to monitor RF signals, interference, or noise at one or more locations of the airport. In a particular example, the survey enables the aircraft to avoid using a "noisy" channel or frequency while offloading data. For example, if the survey indicates that a channel or frequency at a particular gate is relatively noisy, the aircraft may avoid use of the channel or frequency at such gate while offloading data to speed up offloading the data as compared to using a noisier channel (e.g., due to fewer errors).

Use of a terrestrial vehicle to perform a survey is costly and inconvenient. For example, driving the terrestrial vehicle to each gate of the airport and monitoring RF signals is time consuming. Upon completion of the survey, data of the survey may be outdated (e.g., due to change in telecommunications systems or noise characteristics of the airport). As another example, the terrestrial vehicle may be subject to one or more security checkpoints at the airport and may need access to the airfield of the airport, potentially blocking access to the gate by one or more other vehicles and using airport resources (e.g., security).

SUMMARY

In a particular example, an apparatus includes a communications interface configured to receive, at a first aircraft, data related to a radiofrequency (RF) survey of a particular location. The RF survey is based on RF samples from at least a second aircraft. The apparatus further includes a radio, an onboard network system (ONS) configured to determine that the first aircraft is approaching the particular location, and a radio controller coupled to the radio. The radio controller is configured to automatically adjust, based on the RF survey and responsive to determining that the first aircraft is approaching the particular location, a parameter of the radio.

In another example, a method includes receiving, at a first aircraft, data related to an RF survey of a particular location. The RF survey is based on RF samples from at least a second aircraft. The method further includes determining that the first aircraft is approaching the particular location. The method further includes, based on the RF survey and responsive to determining that the first aircraft is approaching the particular location, automatically adjusting a parameter of a radio of the first aircraft.

In another example, a computer-readable medium stores instructions executable by a processor to cause the processor to initiate, perform, or control operations. The operations include receiving, at a first aircraft, data related to an RF survey of a particular location. The RF survey is based on RF samples from at least a second aircraft. The operations further include determining that the first aircraft is approaching the particular location. The operations further include, based on the RF survey and responsive to determining that the first aircraft is approaching the particular location, automatically adjusting a parameter of a radio of the first aircraft.

DETAILED DESCRIPTION

In a particular implementation, an aircraft gathers radio frequency (RF) samples during normal operation (e.g., while waiting at a gate, taxiing, taking off, landing, overflying, etc.). The aircraft sends the RF samples to an RF survey management system (e.g., using a communication channel or network at a gate of an airport). The RF survey management system generates an RF survey based on the data recorded by the aircraft. One or more aircraft use the RF survey to determine one or more radio parameters (e.g., to avoid use of a "noisy" communication channel, such as to offload flight data upon arrival at a gate of an airport).

To illustrate, in one example, a first aircraft receives data associated with the RF survey from the RF survey management system and uses the data to adjust a parameter of a radio of the first aircraft, such as by tuning the radio to a particular frequency or by adjusting a gain of the radio based on the RF survey. The RF survey is based on RF samples recorded during operation by a second aircraft. In an illustrative example, the first aircraft also provides additional RF samples recorded during operation by the first aircraft to enable the RF survey management system to update the RF survey.

By using aircraft to record RF samples for an RF survey, use of a terrestrial vehicle (e.g., a truck or a van) is avoided or reduced. As a result, certain delays or costs associated with terrestrial vehicle based surveys are avoided or reduced, such as delays or costs associated with obtaining security clearance or gate access.

In some cases, an aircraft-based survey is more accurate than a terrestrial vehicle based survey. For example, by using an aircraft antenna and radio to measure RF signals, the RF survey reflects effects of noise due to aircraft components, such as an interference pattern created by operation of an aircraft engine or a frequency response associated with a particular aircraft communication system. As another example, certain aircraft antennas are higher from the ground as compared to an antenna mounted in a terrestrial vehicle. As a result, the aircraft antennas detect different RF samples as compared to antennas associated with terrestrial vehicles.

In some examples, an in-flight aircraft-based RF survey is used to dynamically detect an unexpected condition or a fault. For example, an unexpected or erratic RF signal detected during a flight can indicate that one or more passengers have failed to power-off an electronic device or that an aircraft component is operating in an unexpected manner. As a result, in some cases, "real-time" monitoring of RF samples may be performed to detect, and assist in mitigation of, such conditions.

Figure 1:
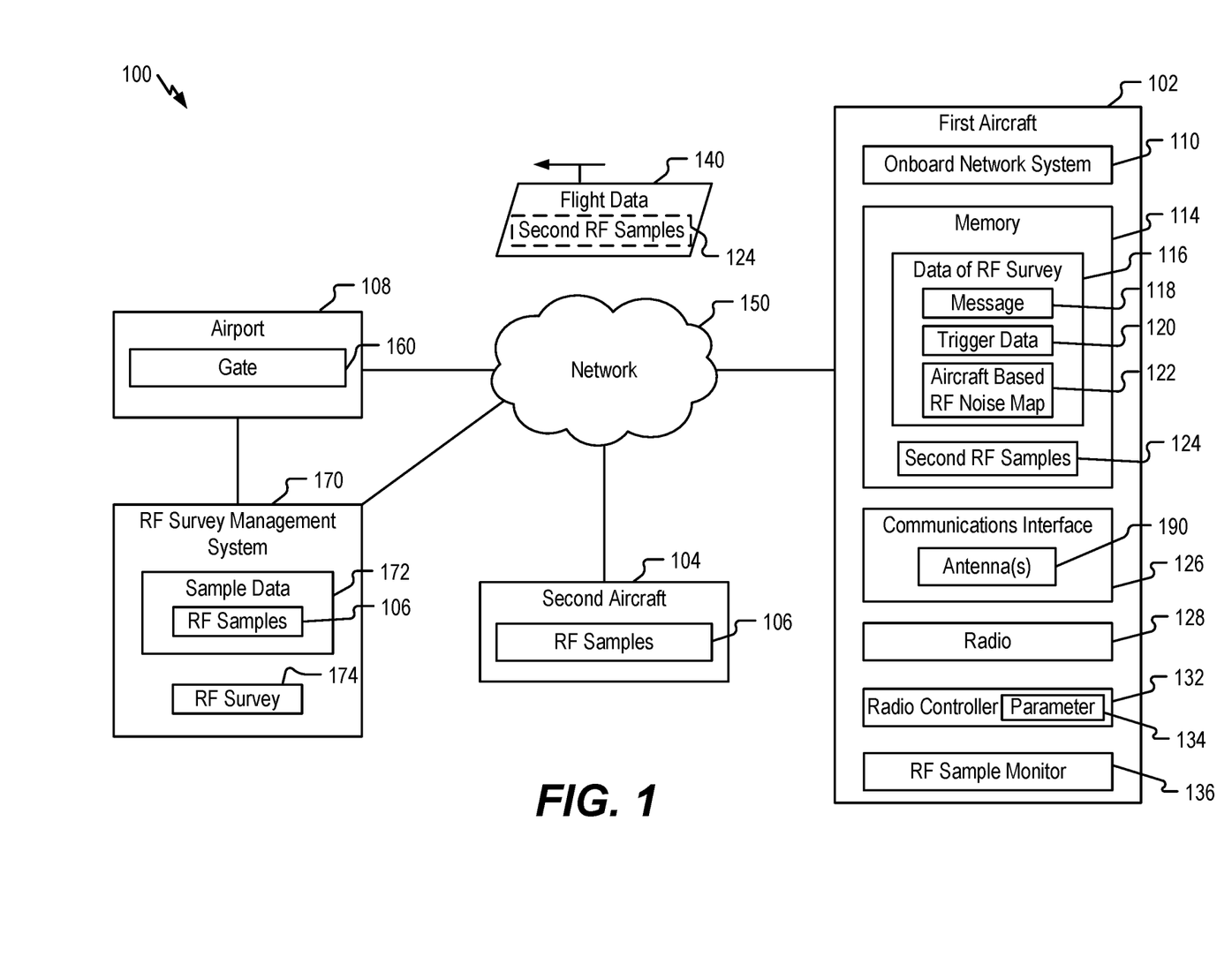
FIG. 1 is a block diagram that illustrates aspects of an example of a system that includes a first aircraft configured to receive data related to a radiofrequency (RF) survey based on RF samples from at least a second aircraft.

Referring to FIG. 1, aspects of an illustrative example of a system are depicted and generally designated 100. The system 100 includes one or more aircraft, such as a first aircraft 102 and a second aircraft 104. FIG. 1 also illustrates that the system 100 includes an airport 108 and a radio frequency (RF) survey management system 170.

The first aircraft 102 includes an onboard network system (ONS) 110, a memory 114, and a communications interface 126. In one example, the communications interface 126 includes one or more antennas 190 that are configured to send and receive information wirelessly. Alternatively or in addition, in another example, the communications interface 126 includes a wired interface, such as a universal serial bus (USB) port that is configured to receive a USB device and that is coupled to the one or more antennas 190.

In some implementations, the ONS 110 includes one or more devices configured to perform navigation operations of the first aircraft 102. In a particular example, the ONS 110 includes a navigation processor configured to determine a location of the first aircraft 102.

The first aircraft 102 also includes a radio 128. In some implementations, the radio 128 includes or corresponds to a radio configured to communicate with a terrestrial device (e.g., a radio tower), a radio configured to communicate with a satellite, a radio configured to communicate with an aircraft, a very high frequency (VHF) radio, an ultra-wideband (UWB) radio, a global positioning system (GPS) radio, a cabin system radio, a radio direction finder (RDF), an automatic direction finder (ADF), a high frequency (HF) radio, a VHF omnidirectional radio range (VOR) localizer, a marker beacon radio, a left VHF radio, a center VHF radio, a right VHF radio, an instrument landing system (ILS) radio, a glideslope radio, distance-measuring equipment (DME) radio, a traffic collision avoidance system (TCAS) radio, a mode-S TCAS radio, a radio altimeter, a low range radio altimeter (LRRA), a microwave landing system (MLS) radio, a satellite communications (SATCOM) radio, a broadband radio, a Ku/Ka broadband radio, an onboard cellular system radio, an off-board cellular system radio, an onboard Wi-Fi system radio (Wi-Fi is a trademark of the Wi-Fi Alliance of Austin, Tex.), an off-board Wi-Fi system radio, a gatelink system radio, one or more other radios, or a combination thereof.

The first aircraft 102 further includes a radio controller 132 configured to control the radio 128. In a particular example, the radio controller 132 is coupled to the radio 128. In a particular example, the first aircraft 102 further includes an RF sample monitor 136.

In a particular implementation, the second aircraft 104 includes one or more features described with reference to the first aircraft 102. In one example, the second aircraft 104 includes one or more of an ONS corresponding to the ONS 110, a memory corresponding to the memory 114, a communications interface corresponding to the communications interface 126, a radio corresponding to the radio 128, a radio controller corresponding to the radio controller 132, or an RF sample monitor corresponding to the RF sample monitor 136.

The airport 108 includes a gate 160 (e.g., a gate that is included in or connected to a terminal of the airport 108). In some implementations, the airport 108 includes, operates, or controls a network 150. In one example, the network 150 includes or corresponds to a wireless network, such as a wireless local area network (WLAN), a cellular network, a high frequency wireless network (e.g., a 60 gigahertz wireless network), one or more other networks, or a combination thereof. In a particular example, the network 150 is controlled or operated by the airport 108 or by a particular airline that operates the first aircraft 102.

The RF survey management system 170 is configured to receive sample data 172 associated with an RF survey 174. In a particular example, the RF survey management system 170 includes one or more computing devices (e.g., a server or other computing device) configured to receive the sample data 172. The sample data 172 includes RF samples gathered by one or more aircraft, such as RF samples 106.

In an illustrative example, the second aircraft 104 gathers the RF samples 106 during operation of the second aircraft 104 (e.g., while waiting at a gate, taxiing, taking off, landing, overflying the airport 108, overflying another geographic region, etc.). The second aircraft 104 is configured to gather the RF samples 106 using a passive scanning technique, an active scanning technique, one or more other techniques, or a combination thereof. In an example of passive scanning, the second aircraft 104 is configured to detect "background" RF signals, noise or interference, such as by scanning a plurality of channels (e.g., frequencies) to quantify RF signals, noise, or interference associated with each frequency. In an example of active scanning, the second aircraft 104 (or another device, such as a radio tower, a vehicle, or another aircraft) is configured to transmit one or more RF signals. During active scanning, the second aircraft 104 is configured to receive the one or more RF signals and to measure one or more characteristics of the received one or more RF signals.

The RF samples 106 indicate one or more characteristics for each of one or more communication channels (e.g., one or more communication channels of the network 150, one or more other networks, or a combination thereof). In one example, the RF samples 106 indicate one or more wireless communication frequencies, a signal strength associated with signals received using each of the wireless communication frequencies, a signal to noise ratio (SNR) associated with each of the signals, a bit error rate (BER) associated with each of the signals, one or more other characteristics, or a combination thereof.

In an illustrative example, the second aircraft 104 is configured to send the RF samples 106 to the RF survey management system 170 (e.g., using the network 150 or another network). As an example, the second aircraft 104 is configured to send the RF samples 106 to the RF survey management system 170 (e.g., via the network 150 of the airport 108) upon arriving at a gate, such as the gate 160.

The RF survey management system 170 is configured to generate the RF survey 174 based on the sample data 172. In a particular example, the RF survey management system 170 is configured to determine one or more parameters of the RF survey 174 based on the RF samples 106, such as by determining one or more of a transmit frequency, a receive frequency, a transmit gain, or a receive gain. In an illustrative example, the RF survey management system 170 is configured to select a frequency (e.g., a transmit frequency or a receive frequency) in response to determining based on the sample data 172 that the frequency is subject to less noise as compared to one or more other frequencies. In a particular example, the RF survey 174 indicates that particular frequency is associated with a high SNR, as an illustrative example.

The RF survey 174 is associated with one or more locations. In a particular example, the RF survey 174 is associated with a plurality of locations including a particular location, such as the gate 160 (or a region proximate to the gate 160, such as a tarmac). In one example, the second aircraft 104 gathers the RF samples 106 using the network 150 while at (or near) the gate 160, and the RF survey 174 specifies one or more parameters associated with the network 150.

The communications interface 126 is configured to receive data 116 related to the RF survey 174. In a particular example, the RF survey management system 170 sends (e.g., "pushes") the data 116 to the first aircraft 102, and the first aircraft 102 receives the data 116 using the communications interface 126. In one example, the RF survey management system 170 sends the data 116 to the first aircraft 102 using a network, such as the network 150 (e.g., while the first aircraft 102 is at the gate 160 or another location of the airport 108).

In some implementations, the data 116 includes or indicates an update of software or settings of the radio controller 132, such as by indicating one or more characteristics of the radio 128. For example, in FIG. 1, the data 116 indicates a parameter 134 usable by the radio controller 132 to control the radio 128.

During operation, the ONS 110 is configured to determine that the first aircraft 102 is approaching a particular location. In one example, the particular location corresponds to the gate 160. In other examples, the particular location corresponds to a location other than the gate 160, such as one or more of a particular latitude, a particular longitude, a particular altitude, or particular GPS coordinates, as illustrative examples. In a particular illustrative example, the ONS 110 is configured to determine that the first aircraft 102 is approaching the particular location by detecting that the first aircraft 102 has initiated a descent to land at the airport 108 or is taxiing after landing at the airport 108.

In some implementations, the data 116 indicates the particular location. As a particular example, in FIG. 1, the data 116 includes trigger data 120. In one example, the communications interface 126 is configured to receive the trigger data 120 from the RF survey management system 170 and to send the trigger data 120 to the memory 114, and the memory 114 is configured to store the trigger data 120. In some examples, the trigger data 120 specifies the particular location. To further illustrate, in some circumstances, the RF survey management system 170 collects the RF samples 106 from multiple locations (including the particular location) by sending trigger data (such as the trigger data 120) to aircraft (e.g., the first aircraft 102 and the second aircraft 104) to cause the aircraft to survey the multiple locations.

The radio controller 132 is configured to automatically adjust the parameter 134 based on data 116 of the RF survey and responsive to determining that the first aircraft 102 is approaching the particular location. In some examples, the radio controller 132 is configured to adjust the parameter 134 by adjusting one or more of a frequency (e.g., a transmit frequency or a receive frequency) of the radio 128 or a gain (e.g., a transmit gain or a receive gain) of the radio 128. In a particular illustrative example, the particular location corresponds to the gate 160 of the airport 108, and the communications interface 126 is configured to offload flight data 140 via the network 150 using the adjusted parameter 134 while the first aircraft 102 is at the gate 160.

In some implementations, the data 116 indicates an aircraft-based RF noise map 122, and the parameter 134 is adjusted in response to the aircraft-based RF noise map 122. In one example, a gain (e.g., a transmit gain or a receive gain) is adjusted based on the aircraft-based RF noise map 122, such as by increasing the gain in response to the aircraft-based RF noise map 122 indicating a greater amount of RF noise or by decreasing the gain in response to the aircraft-based RF noise map 122 indicating a lesser amount of RF noise. Additional illustrative aspects of the aircraft-based RF noise map 122 are described further with reference to FIG. 2.

In an illustrative implementation, the trigger data 120 indicates one or more trigger conditions for adjusting the parameter 134, and the one or more trigger conditions include approaching of the particular location by the first aircraft 102. Alternatively or in addition, in some examples, the one or more trigger conditions include a particular date, time of day, or day of week, and the radio controller 132 is configured to automatically adjust the parameter 134 based the particular date, time of day, or day of week (e.g., in response to a system clock of the first aircraft 102 indicating the particular date, time of day, or day of week).

In some implementations, the first aircraft 102 is configured to perform one or more data gathering operations to enable the RF survey management system 170 to generate or update the RF survey 174. In a particular example, the radio controller 132 is configured to perform the one or more data gathering operations by receiving RF signals using a plurality of wireless channels to generate second RF samples 124 (e.g., by "scanning" a frequency spectrum that includes or corresponds to the plurality of wireless channels).

The second RF samples 124 indicate one or more characteristics for each of one or more communication channels (e.g., one or more communication channels of the network 150, one or more other networks, or a combination thereof). In one example, the second RF samples 124 indicate one or more wireless communication frequencies, a signal strength associated with signals received using each of the wireless communication frequencies, an SNR associated with each of the signals, a BER associated with each of the signals, one or more other characteristics, or a combination thereof.

In a particular example, the data 116 includes a message 118 indicating one or more data gathering operations or conditions associated with the RF survey 174 to be performed by the first aircraft 102. In some examples, the message 118 specifies one or more channels to scan to gather the second RF samples 124, a time to gather the second RF samples 124, a location at which to gather the second RF samples 124, or a combination thereof. To further illustrate, in some examples, the message 118 specifies one or more of a particular date, time of day, or day of week to gather the second RF samples 124, and the radio controller 132 is configured to automatically gather the second RF samples 124 based the particular date, time of day, or day of week (e.g., in response to a system clock of the first aircraft 102 indicating the particular date, time of day, or day of week).

In some implementations, the message 118 indicates one or more radios or antennas of the first aircraft 102 for gathering the second RF samples 124. In a particular example, the message 118 indicates the radio 128 and the one or more antennas 190. In some implementations, the radio 128 is configured to receive RF signals to generate the second RF samples 124 based on one or more commands from the radio controller 132 (based on the message 118).

In a particular example, the communications interface 126 is configured to send the second RF samples 124 to the RF survey management system 170 to enable the RF survey management system 170 to update the RF survey 174 (e.g., upon arriving at the gate 160). In the example of FIG. 1, the flight data 140 includes the second RF samples 124 to be provided to the RF survey management system 170.

In some implementations, the first aircraft 102 is configured to perform one or more data gathering operations of the RF survey 174 (or another RF survey) "in the background" during operation of the first aircraft 102. In one example, the radio controller 132 is configured to detect that the radio 128 is idle, such as by detecting that no RF signals are sent or received by the radio 128 during a particular time duration (e.g., one second, or another threshold time duration). In this example, the radio controller 132 is configured to initiate one or more data gathering operations of the RF survey 174 (e.g., gathering of the second RF samples 124) in response to detecting that the radio 128 is idle.

In some implementations, the RF survey management system 170 is configured to update the RF survey 174 based on the second RF samples 124. In a particular illustrative example, the second RF samples 124 indicate that a particular frequency or channel of the network 150 is subject to noise or interference, and the RF survey management system 170 updates the RF survey 174 to indicate that one or more other frequencies or channels of the network 150 are to be used at the gate 160 (instead of the particular frequency or channel). Alternatively or in addition, in some implementations, the RF samples 106 and the second RF samples 124 enable the RF survey management system 170 to perform one or more of large-scale RF data collection (where "large-scale" refers to the use of multiple aircraft, multiple data collection locations, or both), trend detection (e.g., to detect that a particular location is associated with increased or decreased RF noise), sample comparison (e.g., to detect a malfunction of an aircraft or a component based on an RF sample differing from one or more other RF samples), analytics (e.g., to determine RF noise statistics), or prognostication (e.g., to predict RF noise or other events). Other illustrative aspects of the RF survey 174 are described further with reference to FIG. 2.

In some implementations, the RF sample monitor 136 is configured to receive the second RF samples 124 and to detect (or "flag") one or more conditions (e.g., an unexpected condition or a fault) indicated by the second RF samples 124 during operation of the first aircraft 102. In this example, the first aircraft 102 is configured to perform "real time" analysis of the second RF samples 124 in addition to "offline" analysis of the second RF samples 124 by the RF survey management system 170. In one example, a particular RF sample of the second RF samples 124 (e.g., an unexpected or erratic RF sample) detected during a flight indicates that one or more passengers have failed to power-off an electronic device or that a component of the first aircraft 102 is operating in an unexpected manner. In another example, the RF sample monitor 136 is configured to monitor messages (e.g., probe messages or "beacon" messages) sent onboard to detect a "rogue" device, such as a device mimicking an onboard access point (AP) of the first aircraft 102 in order to perform a "man in the middle" (MIM) attack, a device initiating a distributed denial of service (DDOS) attack, one or more other devices, or a combination thereof. In some implementations, the RF sample monitor 136 is configured to provide an indication of an unexpected condition or a fault to aircraft crew or other personnel, such as by graphically displaying an alert, audibly generating an alert, or both. Thus, in some implementations, the first aircraft 102 is configured to perform "real-time" monitoring of the second RF samples 124 to detect an unexpected condition or a fault.

Further, although the RF samples 106 and the second RF samples 124 are described with reference to certain signal or channel characteristics (e.g., frequency, signal strength, SNR, or BER), in other implementations, one or more other signal or channel characteristics may be detected or measured (alternatively or in addition to frequency, signal strength, SNR, and BER). To illustrate, in some implementations, one or more of the RF samples 106 and the second RF samples 124 indicate GPS location, GPS time, an identifier of a particular GPS satellite, an identifier of a particular AP, a service set identifier (SSID), an identifier of a particular channel (e.g., a time-division channel or a code-division channel), one or more other signal or channel characteristics, or a combination thereof.

One or more aspects described with reference to FIG. 1 improve efficiency of RF surveys as compared to certain terrestrial vehicle based RF surveys. For example, by using aircraft to gather RF samples at gates of an airport, the RF samples are gathered more quickly as compared to a terrestrial vehicle that parks at each gate to gather RF samples. As a result, cost and duration of an RF survey are reduced as compared to a certain terrestrial-vehicle-based RF surveys. In some examples, by reducing cost and duration of an RF survey, the RF survey may be updated more regularly, and aircraft may be provided more up-to-date information to adjust radio parameters as compared to a terrestrial-vehicle-based survey. In addition, by using an aircraft antenna and radio to measure RF signals, the RF survey reflects effects of noise due to aircraft components, such as an interference pattern created by operation of an aircraft engine or a frequency response associated with a particular aircraft communication system. Further, certain aircraft antennas are higher from the ground as compared to an antenna mounted in a terrestrial vehicle. As a result, the aircraft antennas detect different RF samples as compared to the terrestrial vehicle, and an aircraft-based RF survey is more accurate than a terrestrial-vehicle-based RF survey in some cases.

As used herein, an "aircraft-based" RF survey includes at least one operation performed by an aircraft, such as the first aircraft 102, the second aircraft 104, one or more other aircraft, or a combination thereof. In some implementations, an aircraft-based RF survey optionally includes one or more operations performed by another vehicle, such as a terrestrial vehicle. To further illustrate, in one example, a first stage of an aircraft-based RF survey is performed using one or more terrestrial vehicles, and a second stage of the aircraft-based RF survey is performed using one or more aircraft (e.g., to update or "refine" the aircraft-based RF survey). In a non-limiting illustrative example, the first stage includes "course" RF surveying, and the second stage includes "fine" RF surveying.

Figure 2:
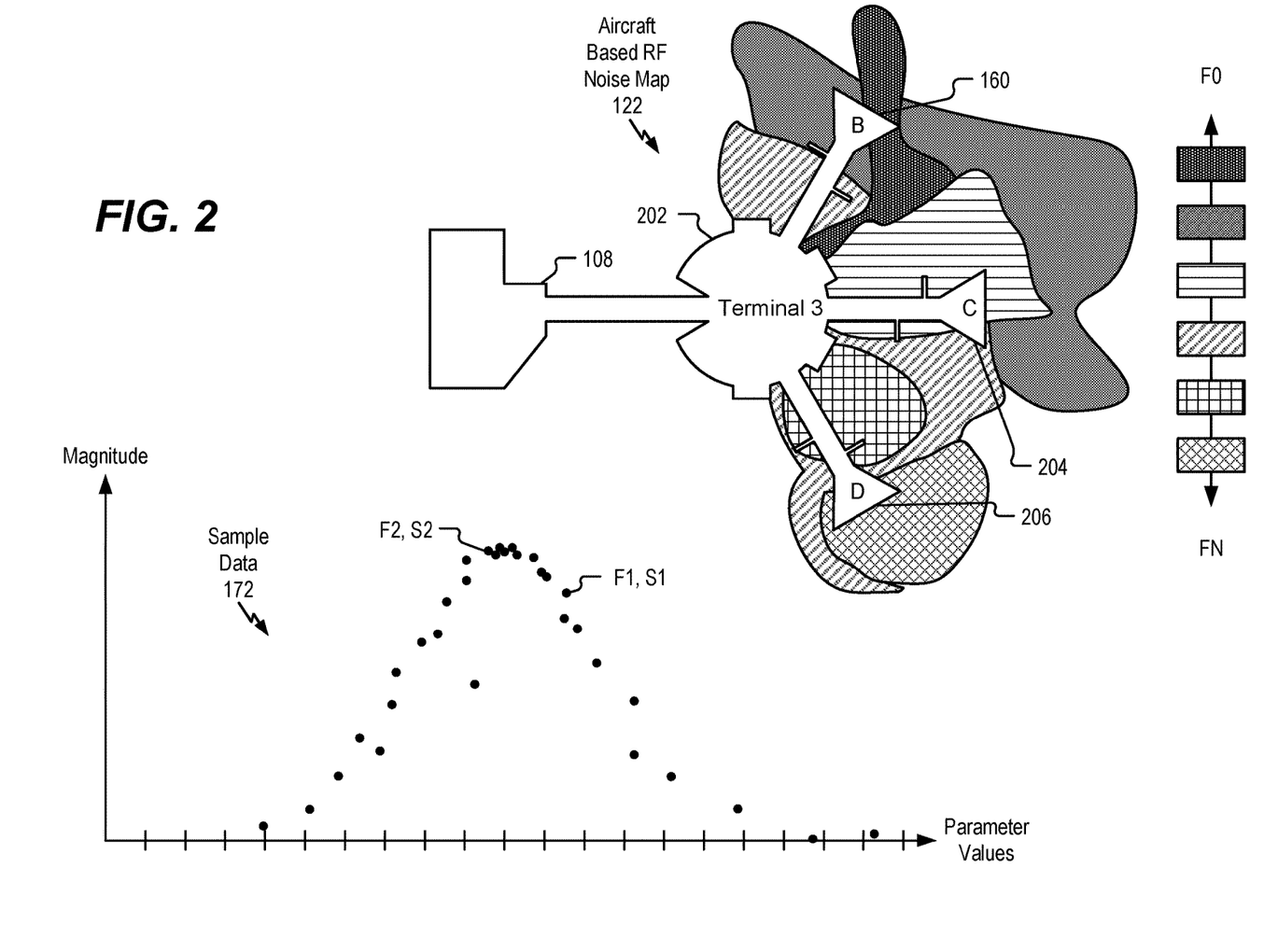
FIG. 2 is a diagram that illustrates aspects of an aircraft-based RF noise map and sample data of an RF survey that are usable by aircraft, such as the first aircraft and the second aircraft of FIG. 1.

FIG. 2 is a diagram that illustrates aspects of an example of the aircraft-based RF noise map 122 and an example of the sample data 172 of the RF survey 174. The aircraft-based RF noise map 122 and the sample data 172 are usable by aircraft, such as the first aircraft 102 and the second aircraft 104 of FIG. 1.

In a particular example, the sample data 172 indicates parameter values along the abscissa and magnitude (e.g., signal strength) associated with the parameter values along the ordinate. In one example, the parameter values correspond to values of the parameter 134. In some examples, the abscissa corresponds to frequencies (e.g., transmit frequencies or receive frequencies) of the radio 128, and the ordinate corresponds to signal strength (e.g., SNR) associated with the frequencies.

To further illustrate, in one example, the data 116 specifies that the first aircraft 102 is to wirelessly communicate using a first frequency F1 associated with a first SNR S1 (e.g., by offloading the flight data 140 using the first frequency F1 while at the gate 160). In some implementations, the first aircraft 102 gathers the second RF samples 124 (e.g., prior to offloading the flight data 140 at the gate 160) using a second frequency F2 associated with a second SNR S2 greater than the first SNR S1. In one example, upon receiving the second RF samples 124, the RF survey management system 170 updates the RF survey 174 to specify the second frequency F2 instead of the first frequency F1 (e.g., to reduce effects of noise associated with communication at the gate 160). In one example, the first frequency F1 and the second frequency F2 correspond to wireless channels of the network 150.

The aircraft-based RF noise map 122 indicates RF samples (e.g., noise, interference, or other RF signals) at one or more locations. In one example, the aircraft-based RF noise map 122 indicates RF samples at one or more airports, such as the airport 108. The airport 108 includes one or more terminals. For example, FIG. 2 depicts that the airport 108 includes a terminal 202 (e.g., "terminal 3"). The terminal 202 is connected to one or more gates, such as the gate 160, a second gate 204, and a third gate 206 (e.g., gates "B," "C," and "D").

In the example of FIG. 2, the aircraft-based RF noise map 122 indicates different frequencies (e.g., F0 . . . FN) associated with different regions of the airport 108. In FIG. 2, each cross-hatching pattern represents a corresponding frequency, such as the "best" frequency (e.g., the frequency with the greatest SNR) among a set of frequencies for each region of the airport 108.

Alternatively or in addition, in some implementations, the aircraft-based RF noise map 122 indicates different signal strength or RF noise at each region of the airport 108. In one example, the gate 160 is associated with a greater amount of RF noise as compared to the second gate 204 and the third gate 206. In another example, the second gate 204 is associated with a greater amount of RF noise as compared to the third gate 206.

In one example, the first aircraft 102 is configured to automatically adjust the parameter 134 based on the aircraft-based RF noise map 122. To illustrate, in one example, the ONS 110 is configured to detect GPS coordinates of the first aircraft 102, and the radio controller 132 is configured to automatically adjust the parameter 134 based on the GPS coordinates and the aircraft-based RF noise map 122. In one example, the radio controller 132 is configured to select a gain of the radio 128, such as by increasing gain in response to determining that the aircraft-based RF noise map 122 indicates less signal strength or by reducing gain in response to determining that the aircraft-based RF noise map 122 indicates more signal strength. Alternatively or in addition, in some examples, the radio controller 132 is configured to select a frequency of the radio 128, such as by selecting a particular frequency indicated by the aircraft-based RF noise map 122 as the "best" frequency among a set of frequencies for a particular location. In other examples, another frequency (other than the "best" frequency) having an appropriate SNR (or other parameter) is selected.

One or more aspects described with reference to FIG. 2 improve efficiency of communication by aircraft. For example, by using the aircraft-based RF noise map 122 to determine a frequency, the first aircraft 102 avoids "hopping around" to identify a frequency for communication. As another example, by using the aircraft-based RF noise map 122 to determine a gain, the first aircraft 102 avoids errors (due to using a gain that is too low) or excessive power consumption (due to using a gain that is too high).

Table 1 indicates additional illustrative aspects of the disclosure. In Table 1, columns indicate flight phases, such as push back from jetway (PB), taxi outbound (TXO), takeoff to climb (TOC), top of descent (TOD), taxi inbound (TXI), and gate-link handshake (GATE). In some examples, one or more of PB, TXO, TOC, TOD, TXI, or GATE correspond to the particular location described with reference to adjustment of the parameter 134.

TABLE 1

|  | PB | TXO | TOC | TOD | TXI | GATE |
|---|---|---|---|---|---|---|
| Location of infrastructure AP | X | X |  |  | X | X |
| Identification of rogue AP (e.g., an MIM attacker) | X | X |  |  | X | X |
| Data quality assessment | X | X |  |  | X | X |
| Signal quality assessment (e.g., SNR) | X | X |  |  | X | X |
| DDOS probe detection | X | X |  |  | X | X |
| Network perimeter definition | X | X |  |  | X | X |
| Unauthorized wireless device | X | X |  |  | X | X |
| Passenger rogue AP | X | X | X | X | X | X |
| RF proximity issues | X | X |  |  | X | X |
| Access attempts or localization | X | X |  |  | X | X |
| Data transfer completion percentage |  | X |  |  | X |  |
| Distance to first connection |  |  |  |  | X | X |
| Spectrum or channel management | X | X |  |  | X | X |
| Wireless network latency measurement |  |  |  |  |  | X |

In Table 1, rows indicate one or more characteristics or aspects to detect (or "test") by receiving one or more RF signals. An "X" in Table 1 indicates that, in a particular implementation, the corresponding characteristic or aspect is detected (or "tested") at the corresponding flight phase. One or more characteristics described with reference to Table 1 may be indicated by the RF samples 106, the second RF samples 124, or both.

Figure 3:
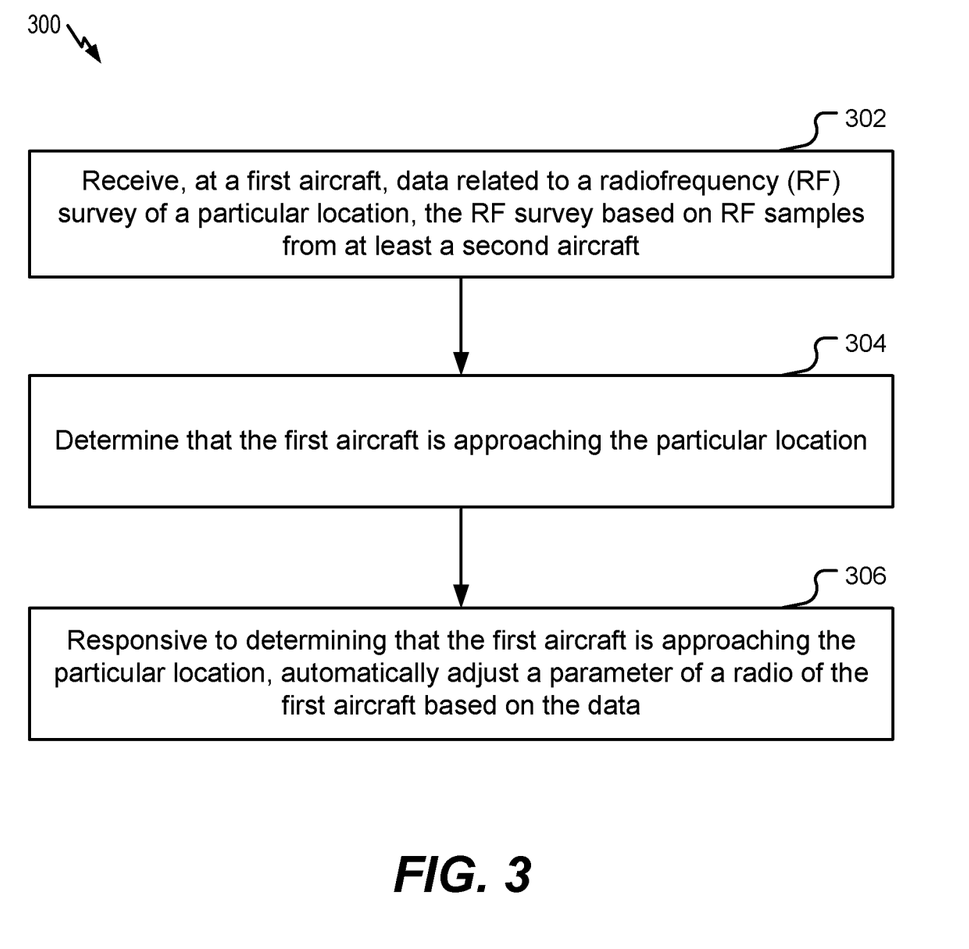
FIG. 3 is a flow chart of an example of a method of operation of a first aircraft using data related to an RF survey based on RF samples from at least a second aircraft.

Referring to FIG. 3, an illustrative example of a method is depicted and generally designated 300. Operations of the method 300 are performed by an aircraft, such as the first aircraft 102 of FIG. 1. Alternatively or in addition, in another example, operations of the method 300 are performed by another aircraft, such as the second aircraft 104 of FIG. 1.

The method 300 includes receiving, at a first aircraft, data related to an RF survey of a particular location, at 302. The RF survey is based on RF samples from at least a second aircraft. In a particular example, the first aircraft 102 of FIG.

1 receives the data 116 related to the RF survey 174 of a particular location, such as the gate 160 of the airport 108. The RF survey 174 is based on the RF samples 106 from at least the second aircraft 104. To further illustrate, in a particular example, the RF samples 106 are gathered by the second aircraft 104 during a flight, during approach of a gate of an airport (e.g., the gate 160 of the airport 108), while at the gate of the airport, or a combination thereof.

The method 300 further includes determining that the first aircraft is approaching the particular location, at 304. In one example, the ONS 110 of FIG. 1 determines that the first aircraft 102 is approaching the particular location using one or more of a particular latitude of the first aircraft 102, a particular longitude of the first aircraft 102, a particular altitude of the first aircraft 102, a particular attitude of the first aircraft 102, or particular GPS coordinates of the first aircraft 102, as illustrative examples.

The method 300 further includes automatically adjusting, based on the RF survey and responsive to determining that the first aircraft is approaching the particular location, a parameter of a radio (e.g., the radio 128) of the first aircraft, at 306. In a particular example, the first aircraft 102 of FIG. 1 automatically adjusts the parameter 134 based on the RF survey 174 (or based on the data 116 related to the RF survey 174) in response to the ONS 110 determining that the first aircraft 102 is approaching the gate 160 (or another location). In some examples, adjusting the parameter 134 includes adjusting at least one of a transmit frequency of the radio 128 or a receive frequency of the radio 128. Alternatively or in addition, in some implementations, adjusting the parameter 134 includes adjusting at least one of a transmit gain of the radio 128 or a receive gain of the radio 128.

In some implementations, the data 116 indicates an RF noise map (e.g., the aircraft-based RF noise map 122), and the parameter 134 is adjusted in response to the RF noise map. In one example, a gain (e.g., a transmit gain or a receive gain) is adjusted based on the RF noise map, such as by increasing the gain in response to the RF noise map indicating a greater amount of RF noise or by decreasing the gain in response to the RF noise map indicating a lesser amount of RF noise.

In some implementations, the method 300 further includes performing one or more data gathering operations indicated by the data 116 of FIG. 1. In a particular example, the data 116 includes the message 118 indicating one or more data gathering operations associated with the RF survey 174 to be performed by the first aircraft 102. In some examples, the message 118 specifies one or more channels to scan to gather the second RF samples 124, a time to gather the second RF samples 124, a location at which to gather the second RF samples 124, or a combination thereof. In one example, the method 300 further includes gathering the second RF samples 124 by scanning one or more communication channels during operation of the first aircraft 102 and offloading the flight data 140, upon arrival at the gate 160 of the airport 108, from the first aircraft 102 while the first aircraft 102 is at the gate 160. In this example, the flight data 140 includes the second RF samples 124.

One or more aspects described with reference to FIG. 3 improve efficiency of RF surveys as compared to certain terrestrial-vehicle-based RF surveys. For example, by using aircraft to gather RF samples at gates of an airport, the RF samples are gathered more quickly as compared to a terrestrial vehicle that parks at each gate to gather RF samples. As a result, cost and duration of an RF survey are reduced as compared to a certain terrestrial-vehicle-based RF surveys.

Figure 4:
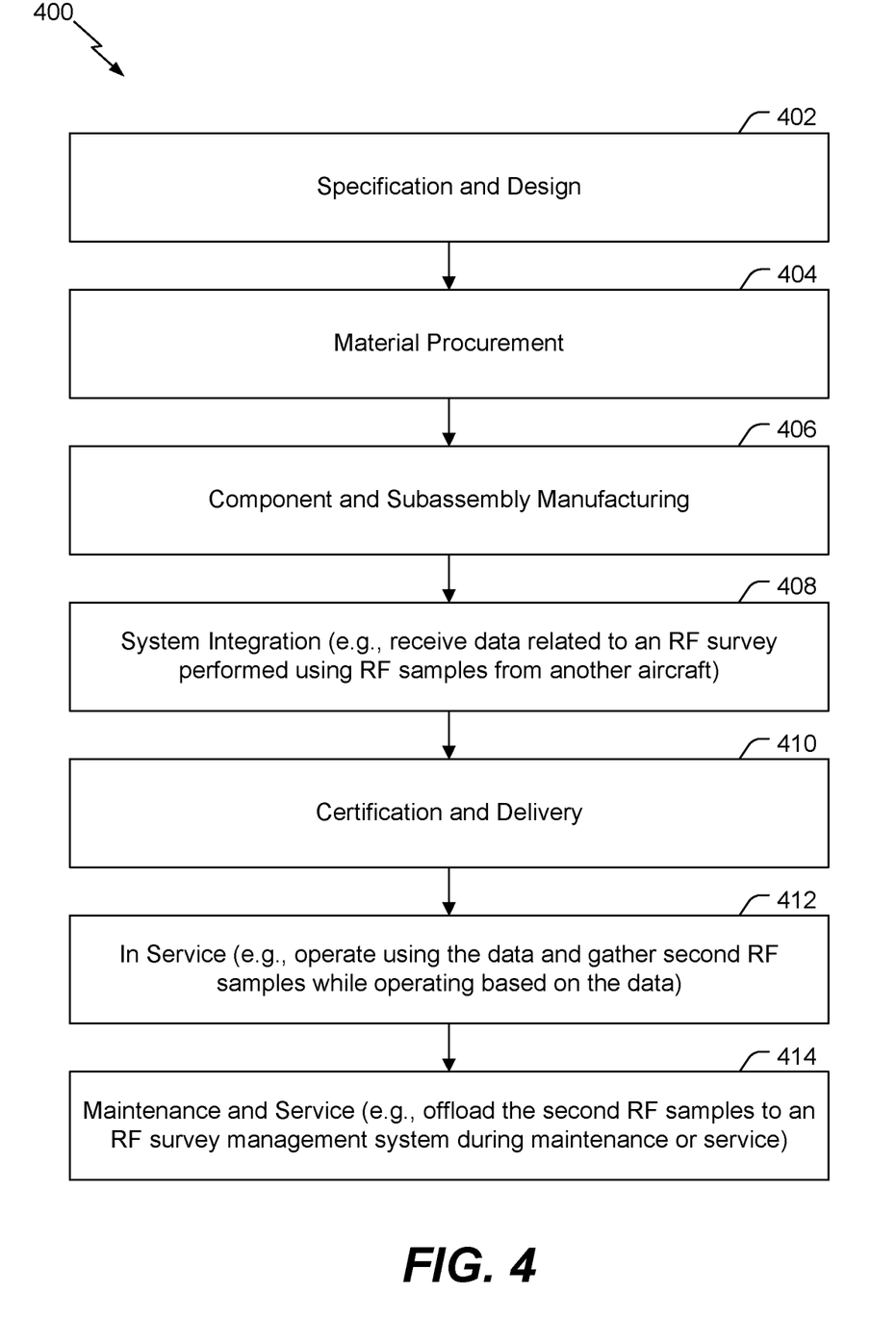
FIG. 4 is a flow chart of an example of a method associated with an aircraft-based RF survey.

Referring to FIG. 4, a flowchart of an illustrative example of a method associated with an aircraft-based RF survey is shown and designated 400. During pre-production, the exemplary method 400 includes, at 402, specification and design of an aircraft, such as the first aircraft 102, the second aircraft 104, or both. During the specification and design of the aircraft, the method 400 includes specifying the ONS 110, the memory 114, the communications interface 126, the radio 128, and the radio controller 132.

At 404, the method 400 includes material procurement. For example, the method 400 may include procuring materials (such as materials for the ONS 110, the memory 114, the communications interface 126, the radio 128, and the radio controller 132) for the first aircraft 102.

During production, the method 400 includes, at 406, component and subassembly manufacturing and, at 408, system integration of the aircraft. The method 400 may include component and subassembly manufacturing (e.g., the ONS 110, the memory 114, the communications interface 126, the radio 128, and the radio controller 132) of the first aircraft 102 and system integration (e.g., coupling the components) of the first aircraft 102. In one example, system integration of the aircraft includes receiving data related to an RF survey using RF samples from another aircraft, such as by receiving the data 116 related to the RF survey 174.

At 410, the method 400 includes certification and delivery of the aircraft and, at 412, placing the aircraft in service. In some implementations, certification and delivery includes certifying the first aircraft 102. Placing the aircraft in service may also include storing the data 116 at the memory 114. In one example, during service, the aircraft operates using the data 116 and gathers the second RF samples 124 while operating based on the data 116.

While in service, the aircraft may be scheduled for routine maintenance and service (which may also include modification, reconfiguration, refurbishment, and so on). At 414, the method 400 includes performing maintenance and service on the aircraft. The method 400 may include updating the data 116. In some examples, the maintenance and service of the first aircraft 102 includes offloading the second RF samples 124 to the RF survey management system 170. In one example, maintenance and service of first aircraft 102 includes updating the data 116 to indicate the parameter 134, to indicate the second frequency instead of the first frequency, or a combination thereof.

Figure 5:
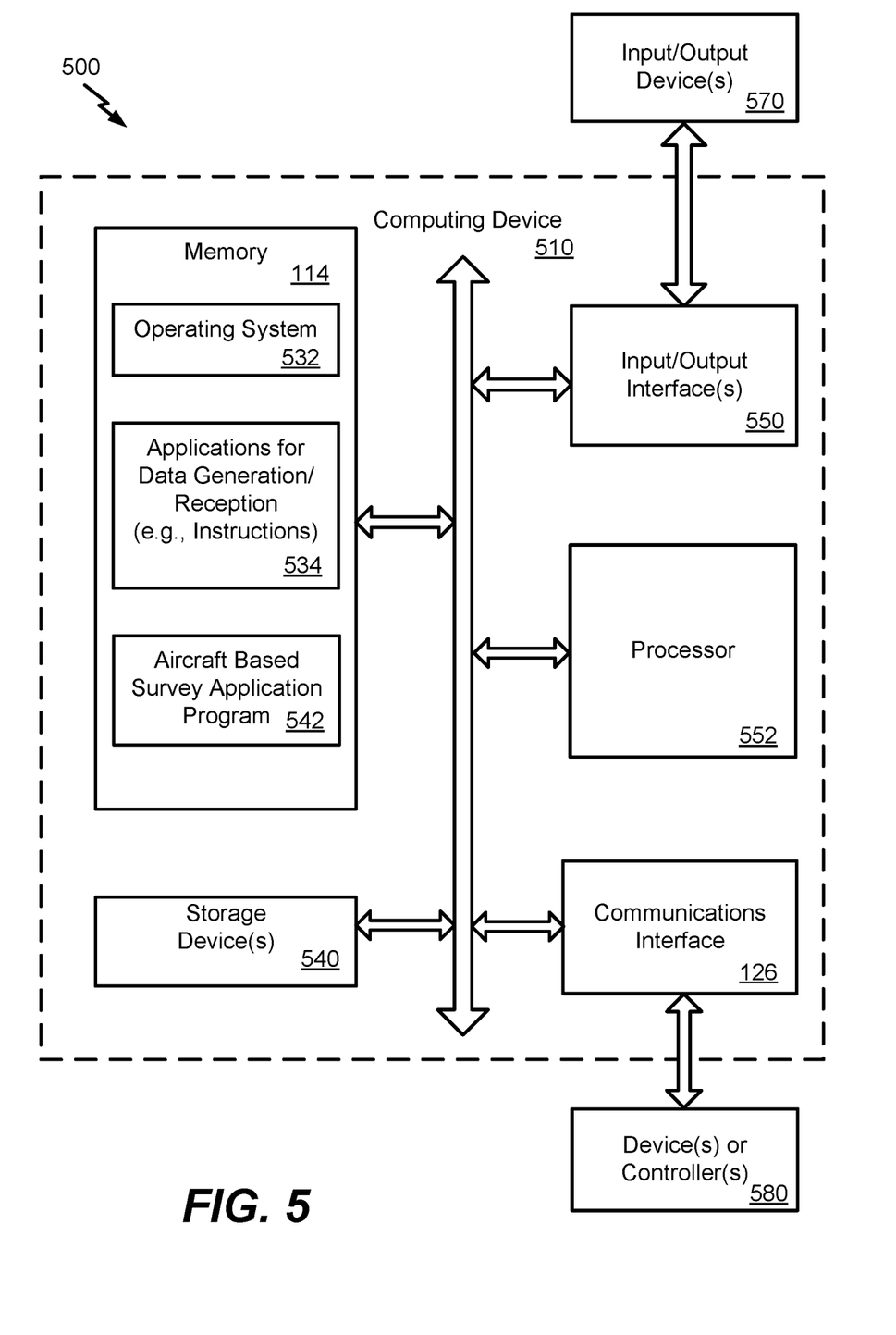
FIG. 5 is a block diagram illustrating aspects of an example of a computing system configured to generate or operate using an aircraft-based RF survey.

FIG. 5 is an illustration of a block diagram of a computing environment 500 including a device 510 (e.g., a general-purpose computing device) configured to support embodiments of computer-implemented methods and computer-executable program instructions (or code) according to the present disclosure. For example, the computing device 510, or portions thereof, may execute instructions to perform or initiate the functions of the first aircraft 102, the second aircraft 104, or the RF survey management system 170. For example, the computing device 510, or portions thereof, may execute instructions to perform the functions of the radio controller 132. The computing device 510, or portions thereof, may further execute instructions according to any of the methods described herein, or to enable any of the methods described herein, such as the method 300 of FIG. 3.

The computing device 510 includes a processor 552. The processor 552 may include or correspond to one or more of the ONS 110 or the radio controller 132. The processor 552 may communicate with the memory 114 (e.g., a system memory, one or more storage devices 540, one or more input/output interfaces 550, one or more communications interfaces 126, or a combination thereof.

The memory 114 may include volatile memory devices (e.g., random access memory (RAM) devices), nonvolatile memory devices (e.g., read-only memory (ROM) devices, programmable read-only memory, and flash memory), or both. The memory 114 may include an operating system 532, which may include a basic/input output system for booting the computing device 510 as well as a full operating system to enable the computing device 510 to interact with users, other programs, and other devices. The memory 114 may include one or more applications 534 which may be executable by the processor 552. For example, the one or more applications 534 may include instructions executable by the processor 552 to operate the radio controller 132. The memory 114 further stores an aircraft-based survey application program 542 that is executable by the processor 552 to perform one or more operations described herein, such as operations of the method 300 of FIG. 3.

The processor 552 may also communicate with one or more storage devices 540. For example, the one or more storage devices 540 may include nonvolatile storage devices, such as magnetic disks, optical disks, or flash memory devices. The storage devices 540 may include both removable and non-removable memory devices. The storage devices 540 may be configured to store an operating system, images of operating systems, applications, and program data. In a particular example, the memory 114, the storage devices 540, or both, include tangible computer-readable media.

The processor 552 may communicate with one or more input/output interfaces 550 that enable the computing device 510 to communicate with one or more input/output devices 570 to facilitate user interaction. The input/output interfaces 550 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 570 may include keyboards, pointing devices, displays, speakers, microphones, touch screens, and other devices. The processor 552 may detect interaction events based on user input received via the input/output interfaces 550. Additionally, the processor 552 may send a display to a display device via the input/output interfaces 550.

The processor 552 may communicate with (or send signals to) one or more devices, such as a radio tower of the airport 108 or the RF survey management system 170. The communications interface 126 may include one or more wired interfaces (e.g., Ethernet interfaces), one or more wireless interfaces that comply with an IEEE 802.11 communication protocol, other wireless interfaces, optical interfaces, or other network interfaces. The one or more devices 580 may include host computers, servers, workstations, and other computing devices.

In conjunction with the described examples, a computer-readable medium (e.g., the memory 114) stores instructions (e.g., the aircraft-based survey application program 542) executable by a processor (e.g., the processor 552) to cause the processor to initiate, perform, or control operations. The operations include receiving (e.g., using the communications interface 126), at a first aircraft (e.g., the first aircraft 102), data (e.g., the data 116) related to an RF survey (e.g., the RF survey 174) of a particular location (e.g., the gate 160 or another location). The RF survey is based on RF samples (e.g., the RF samples 106) from at least a second aircraft (e.g., the second aircraft 104). The operations further include determining (e.g., using the ONS 110) that the first aircraft is approaching the particular location. The operations further include, based on the RF survey and responsive to determining that the first aircraft is approaching the particular location, automatically adjusting a parameter (e.g., the parameter 134) of a radio (e.g., the radio 128) of the first aircraft. In a particular example, the instructions are further executable by the processor to adjust the parameter by adjusting at least one of a transmit frequency of the radio, a receive frequency of the radio, a transmit gain of the radio, or a receive gain of the radio. In some implementations, the instructions include an aircraft-based survey application program (e.g., the aircraft-based survey application program 542) executable by the processor to adjust the parameter based on the RF survey, to gather second RF samples (e.g., the second RF samples 124) of the RF survey, and to initiate a transfer operation to offload the second RF samples to an RF survey management system (e.g., the RF survey management system 170).

Figure 6:
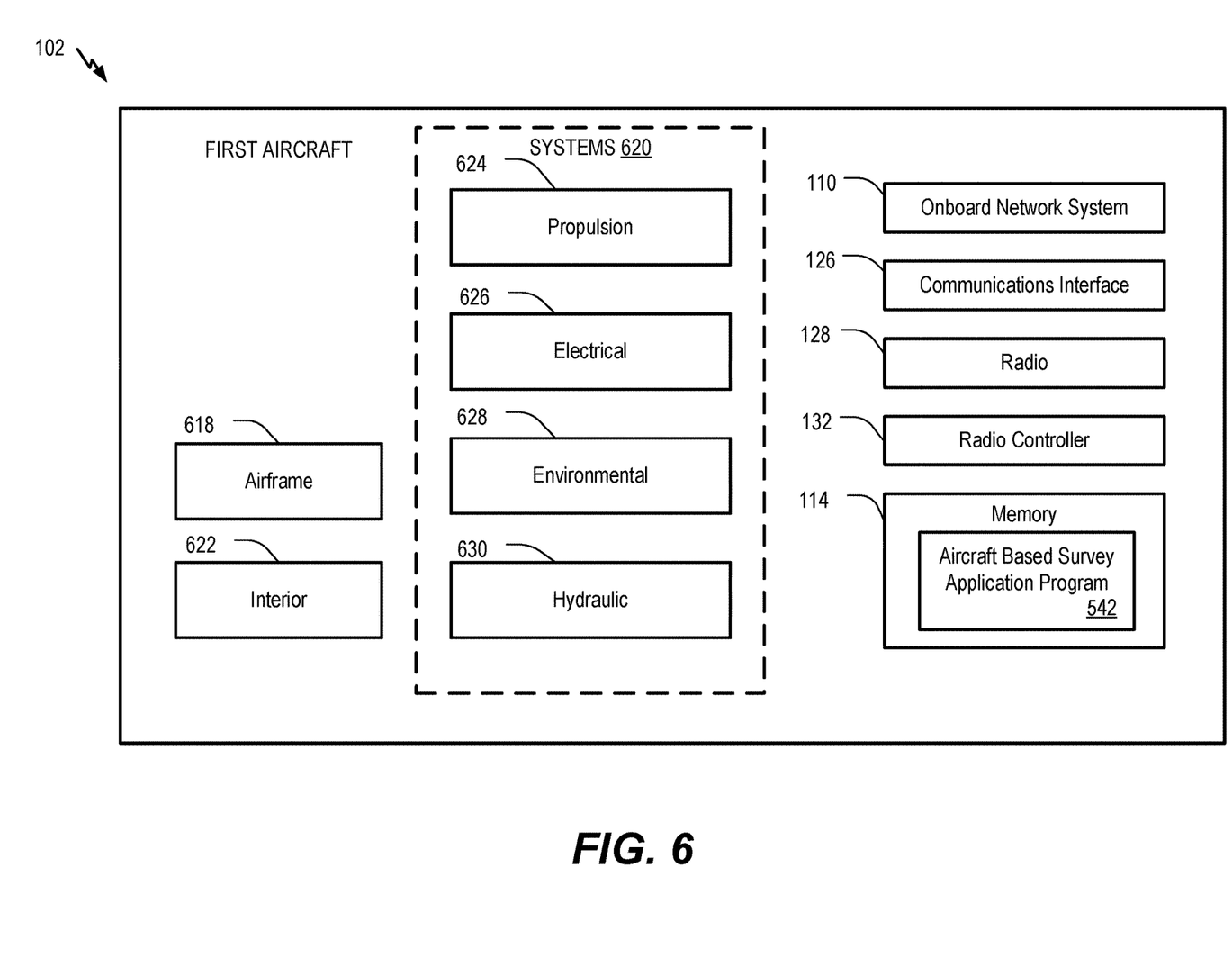
FIG. 6 is a block diagram illustrating aspects of an illustrative implementation of an aircraft configured to operate using an aircraft-based RF survey.

Aspects of the disclosure may be described in the context of an example of the first aircraft 102 as shown in FIG. 6. The first aircraft 102 includes the ONS 110, the communications interface 126, the radio 128, the radio controller 132, and the memory 114 storing the aircraft-based survey application program 542.

As shown in FIG. 6, the first aircraft 102 includes an airframe 618 with a plurality of systems 620 and an interior 622. Examples of the plurality of systems 620 include one or more of a propulsion system 624, an electrical system 626, a hydraulic system 630, and an environmental system 628. Any number of other systems may be included.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate, but do not limit, the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An apparatus comprising:
a communications interface configured to receive, at a first aircraft, data related to a radiofrequency (RF) survey of a particular location, the RF survey based on RF samples from at least a second aircraft, wherein the RF survey indicates a transmit frequency associated with the particular location, a receive frequency associated with the particular location, a transmit gain associated with the particular location, a receive gain associated with the particular location, or a combination thereof;
an onboard network system (ONS) configured to determine that the first aircraft is approaching the particular location;
a radio; and
a radio controller coupled to the radio and configured to automatically adjust, based on the RF survey and responsive to determining that the first aircraft is approaching the particular location, a parameter of the radio, wherein the parameter is adjusted based on the transmit frequency, receive frequency, transmit gain, receive gain, or a combination thereof.

2. The apparatus of claim 1, wherein the radio controller is further configured to adjust the parameter by adjusting one or more of a frequency of the radio or a gain of the radio.

3. The apparatus of claim 1, wherein the particular location corresponds to a gate of an airport, and wherein the communications interface is further configured to offload flight data using a network at the airport using the adjusted parameter while the first aircraft is at the gate.

4. The apparatus of claim 1, further comprising a memory configured to store trigger data indicating one or more trigger conditions for adjusting the parameter, the one or more trigger conditions comprising approaching of the particular location by the first aircraft.

5. The apparatus of claim 4, wherein the one or more trigger conditions further comprise a particular date, time of day, or day of week, and wherein the radio controller is further configured to automatically adjust the parameter based the particular date, time of day, or day of week.

6. The apparatus of claim 4, wherein the communications interface is further configured to receive the trigger data from an RF survey management system, and wherein the radio controller is further configured to send the trigger data to the memory.

7. The apparatus of claim 1, wherein the radio controller is further configured to receive RF signals using a plurality of wireless channels to generate second RF samples of the RF survey.

8. The apparatus of claim 7, wherein the communications interface is further configured to send the second RF samples to an RF survey management system to enable the RF survey management system to update the RF survey.

9. The apparatus of claim 8, wherein the RF samples and the second RF samples enable the RF survey management system to perform one or more of large-scale RF data collection, trend detection, sample comparison, analytics, or prognostication.

10. A method comprising:
receiving, at a first aircraft via a communications interface, data related to a radiofrequency (RF) survey of a particular location, the RF survey based on RF samples from at least a second aircraft, wherein the RF survey indicates a transmit frequency associated with the particular location, a receive frequency associated with the particular location, a transmit gain associated with the particular location, a receive gain associated with the particular location, or a combination thereof;
determining that the first aircraft is approaching the particular location by an onboard network system (OBS); and
based on the RF survey and responsive to determining that the first aircraft is approaching the particular location, adjusting, by a radio controller, a parameter of a radio of the first aircraft, wherein the parameter is adjusted based on the transmit frequency, receive frequency, transmit gain, receive gain, or a combination thereof.

11. The method of claim 10, wherein adjusting the parameter comprises adjusting at least one of a particular transmit frequency of the radio or a particular receive frequency of the radio.

12. The method of claim 10, wherein adjusting the parameter comprises adjusting at least one of a particular transmit gain of the radio or a particular receive gain of the radio.

13. The method of claim 10, wherein the RF samples are gathered by the second aircraft during a flight, during approach of a gate of an airport, while at the gate of the airport, or a combination thereof.

14. The method of claim 10, wherein the data comprising a message indicating one or more data gathering operations associated with the RF survey to be performed by the first aircraft.

15. The method of claim 14, wherein the message specifies one or more channels to scan to gather second RF samples, a time to gather the second RF samples, a location at which to gather the second RF samples, or a combination thereof.

16. The method of claim 15, further comprising:
gathering second RF samples by scanning one or more communication channels during operation of the first aircraft; and
upon arrival at a gate of an airport, offloading flight data from the first aircraft while the first aircraft is at the gate, the flight data comprising the second RF samples.

17. The method of claim 10, wherein the data indicates an RF noise map, and wherein the parameter is adjusted in response to the RF noise map.

18. A computer-readable medium storing instructions executable by a processor to cause the processor to initiate, perform, or control operations comprising:
receiving, at a first aircraft, data related to a radiofrequency (RF) survey of a particular location, the RF survey based on RF samples from at least a second aircraft, wherein the RF survey indicates a transmit frequency associated with the particular location, a receive frequency associated with the particular location, a transmit gain associated with the particular location, a receive gain associated with the particular location, or a combination thereof;
determining that the first aircraft is approaching the particular location; and
based on the RF survey and responsive to determining that the first aircraft is approaching the particular location, adjusting a parameter of a radio of the first aircraft, wherein the parameter is adjusted based on the transmit frequency, receive frequency, transmit gain, receive gain, or a combination thereof.

19. The computer-readable medium of claim 18, wherein the instructions are further executable by the processor to adjust the parameter by adjusting at least one of a particular transmit frequency of the radio, a particular receive frequency of the radio, a particular transmit gain of the radio, or a particular receive gain of the radio.

20. The computer-readable medium of claim 18, wherein the instructions comprise an aircraft-based survey application program executable by the processor to adjust the parameter based on the RF survey, to gather second RF samples of the RF survey, and to initiate a transfer operation to offload the second RF samples to an RF survey management system.

* * * * *